US009697781B2

(12) United States Patent
Chen

(10) Patent No.: US 9,697,781 B2
(45) Date of Patent: Jul. 4, 2017

(54) LIQUID CRYSTAL DISPLAY DEVICE WITH A PLURALITY OF SYNCHRONIZED TIMING CONTROLLERS AND DISPLAY DRIVING METHOD THEREOF

(71) Applicant: Shenzhen China Star Optoelectronics Technology Co., Ltd., Shenzhen, Guangdong (CN)

(72) Inventor: Yin-hung Chen, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 308 days.

(21) Appl. No.: 13/810,475

(22) PCT Filed: Dec. 19, 2012

(86) PCT No.: PCT/CN2012/086924
§ 371 (c)(1),
(2) Date: Jan. 16, 2013

(87) PCT Pub. No.: WO2014/089859
PCT Pub. Date: Jun. 19, 2014

(65) Prior Publication Data
US 2014/0160109 A1 Jun. 12, 2014

(51) Int. Cl.
*G06F 3/038* (2013.01)
*G09G 3/36* (2006.01)

(52) U.S. Cl.
CPC ......... *G09G 3/3611* (2013.01); *G09G 3/3685* (2013.01)

(58) Field of Classification Search
CPC ........................... G09G 3/3611; G09G 3/3685
(Continued)

(56) References Cited

U.S. PATENT DOCUMENTS 8,736,532 B2 * 5/2014 Oh ....................... G09G 3/2092 345/96
2006/0007114 A1 * 1/2006 Shiraishi ............. G09G 3/3611 345/103

(Continued)

FOREIGN PATENT DOCUMENTS

CN 102592531 A 7/2012
CN 101923839 A 12/2012

*Primary Examiner* — Chanh Nguyen
*Assistant Examiner* — Yuzhen Shen
(74) *Attorney, Agent, or Firm* — Andrew C. Cheng

(57) ABSTRACT

The present invention provides a liquid crystal display device (LCD) and display driving method thereof. The LCD includes display panel; scan driver; a plurality of data drivers; first timing controller, for controlling scan driver, receiving and processing first signal, outputting synchronization signal and first driving control signal, the first driving control signal controlling first data driver to drive display of all pixels in a part of pixel rows of n pixel rows; and second timing controller, for receiving synchronization signal and second data signal, processing second data signal, outputting second driving control signal, second driving control signal controlling second data driver to drive display of all pixels in the other part of pixel rows of the n pixel rows. As such, through modifying input and output of two timing controllers, the present invention makes two timing controllers to synchronously support high resolution output of LCD.

8 Claims, 5 Drawing Sheets

(58) Field of Classification Search
USPC .................................................... 345/99, 204
See application file for complete search history.

(56) References Cited

U.S. PATENT DOCUMENTS

| | | | | |
|---|---|---|---|---|
| 2006/0197730 | A1* | 9/2006 | Ooga et al. | 345/98 |
| 2008/0001890 | A1* | 1/2008 | Song | G09G 3/3614 345/96 |
| 2010/0302214 | A1* | 12/2010 | Kim et al. | 345/204 |
| 2011/0007257 | A1* | 1/2011 | Min | G02F 1/136286 349/150 |
| 2012/0127145 | A1* | 5/2012 | Jang et al. | 345/211 |
| 2012/0249605 | A1* | 10/2012 | Kim et al. | 345/690 |
| 2013/0147782 | A1* | 6/2013 | Hsu | G09G 3/20 345/212 |
| 2013/0222216 | A1* | 8/2013 | Park et al. | 345/55 |
| 2014/0204065 | A1* | 7/2014 | Park et al. | 345/204 |

* cited by examiner

LIQUID CRYSTAL DISPLAY DEVICE WITH A PLURALITY OF SYNCHRONIZED TIMING CONTROLLERS AND DISPLAY DRIVING METHOD THEREOF

BACKGROUND OF THE INVENTION

1. Field of the Invention

The present invention relates to the field of liquid crystal displaying techniques, and in particular to a liquid crystal display device and display driving method thereof.

2. The Related Arts

Recently, as liquid crystal displaying techniques undergo fast development and higher demands on the liquid crystal display device, the liquid crystal display device further progress towards high resolution, large size and more vivid display quality. Nowadays, the liquid crystal display devices are the first choice of display device for TV, computers, digital camera, and cell phone.

The output of the image in the display device comprises a plurality of pixels of different luminance. Each pixel comprises three sub-pixels, with each sub-pixel of the red (R), green (G) and blue (B) color. The display of the pixel is controlled by the data driver and the scan driver. The data driver and the scan driver are controlled by the control signals outputted by the timing controller. For a more refined display (i.e., high resolution), the image must comprise more pixels, in other words, more R sub-pixel, G sub-pixel and B sub-pixel. Therefore, the timing controller must process more data to output controls signals. A single timing controller may be insufficient to process more data and the processing speed becomes slower. On the other hand, the cost to build a timing controller able to process more data or accelerate processing speed is expensive. Therefore, a display device with a resolution of 4000*2000 must be disposed with more timing controllers. Currently, there is no available technique of using a plurality of timing controller to support high resolution output in display device.

SUMMARY OF THE INVENTION

The technical issue to be addressed by the present invention is to provide a technique of using two timing controllers to support high resolution output in display device.

The present invention provides a liquid crystal display device, characterized in that the liquid crystal display device comprises: a display panel, further comprising n of pixel rows, n being a multiple of 2, each pixel row comprising a plurality of pixels; a scan driver, comprising a plurality of scan line extending outwards, each scan line being connected correspondingly to pixels of the same column of each pixel row; a plurality of data drivers, comprising a plurality of data lines extending outwards, each data line being connected to two adjacent two rows of pixels in crisscross manner to provide a plurality of pixel voltages to the plurality of pixels; a first timing controller, for controlling the scan driver, receiving and processing a first signal, outputting a synchronization signal and a first driving control signal, the first driving control signal controlling the first data driver to drive the display of all pixels in a part of pixel rows of the n pixel rows; and a second timing controller, for receiving the synchronization signal and a second data signal, processing the second data signal, outputting a second driving control signal, the second driving control signal controlling the second data driver to drive the display of all pixels in the other part of pixel rows of the n pixel rows.

According to a preferred embodiment of the present invention, each pixel comprises an R sub-pixel, a G sub-pixel and a B sub-pixel, and the R sub-pixel, G sub-pixel and B sub-pixel are arranged in column so that the display panel comprises 3n sub-pixel rows.

According to a preferred embodiment of the present invention, the first data signal comprises the data of all pixels from the first pixel row to the n/2-th pixel row and the data of all virtual pixels of a virtual pixel row inserted before the first pixel row; the second data signal comprises the data of all pixels from the n/2-th pixel row to the n-th pixel row.

According to a preferred embodiment of the present invention, the first data signal comprises the data of all pixels from the first pixel row to the n/2-th pixel row, the first timing controller transmits all B sub-pixel data of the B sub-pixel row of the n/2-th pixel row of the first data signal to the second timing control so as to make the second data signal comprise all B sub-pixel data of the B sub-pixel row of the n/2-th pixel row and the data of all pixels from (n+2)/2-th pixel row to n-th pixel row.

According to a preferred embodiment of the present invention, the first driving control signal comprises the data of all pixels from the first pixel row to the n/2-th pixel row; the second driving control signal comprises a plurality of B sub-pixel data of the B sub-pixel row of the n/2-th pixel row and the data of all pixels from (n+2)/2-th pixel row to n-th pixel row.

The present invention provides a display driving method of liquid crystal display device, applicable to a liquid crystal display device comprising n pixel rows, characterized in that the display driving method comprises the following steps: (a) providing a first data signal and a second data signal, wherein the first data signal comprising data of all pixels of a part of pixel rows of the n pixel rows, the second data signal comprising data of all pixels of the other part of pixel rows of the n pixel rows; (b) a first timing control outputting a synchronization signal and receiving a first driving control signal outputted from the first data signal; a second timing controller receiving the synchronization signal to synchronize operation with the first timing controller, and receiving and processing the first driving control signal outputted from the second data signal; and (c) the first timing controller controlling a scan driver to scan all pixels column by column, the first driving control signal driving the display of all pixels of a part of pixel rows of the n pixel rows, the second driving control signal driving the display of all pixels of the other part of pixel rows of the n pixel rows.

According to a preferred embodiment of the present invention, each pixel comprises an R sub-pixel, a G sub-pixel and a B sub-pixel, and the R sub-pixel, G sub-pixel and B sub-pixel are arranged in column so that the display panel comprises 3n sub-pixel rows.

According to a preferred embodiment of the present invention, the method further forms the first data signal by comprising the data of all pixels from the first pixel row to the n/2-th pixel row and the data of all virtual pixels of a virtual pixel row inserted before the first pixel row; and forms the second data signal by comprising the data of all pixels from the n/2-th pixel row to the n-th pixel row.

According to a preferred embodiment of the present invention, the method further forms the first data signal by comprising the data of all pixels from the first pixel row to the n/2-th pixel row, through the first timing controller to transmit all B sub-pixel data of the B sub-pixel row of the n/2-th pixel row of the first data signal to the second timing control so as to make the second data signal comprise all B sub-pixel data of the B sub-pixel row of the n/2-th pixel row and the data of all pixels from (n+2)/2-th pixel row to n-th pixel row.

According to a preferred embodiment of the present invention, the first driving control signal comprises the data of all pixels from the first pixel row to the n/2-th pixel row; the second driving control signal comprises a plurality of B sub-pixel data of the B sub-pixel row of the n/2-th pixel row and the data of all pixels from (n+2)/2-th pixel row to n-th pixel row.

According to the liquid crystal display device and display driving method thereof, by changing the input and output manner of two timing controllers, the present invention can use two timing controller to synchronize to support the high resolution output of the liquid crystal display.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

For better description of the technique and effect of the present invention, the following refers to embodiments and drawings for detailed description, wherein the same label indicates the same element.

Figure 1:
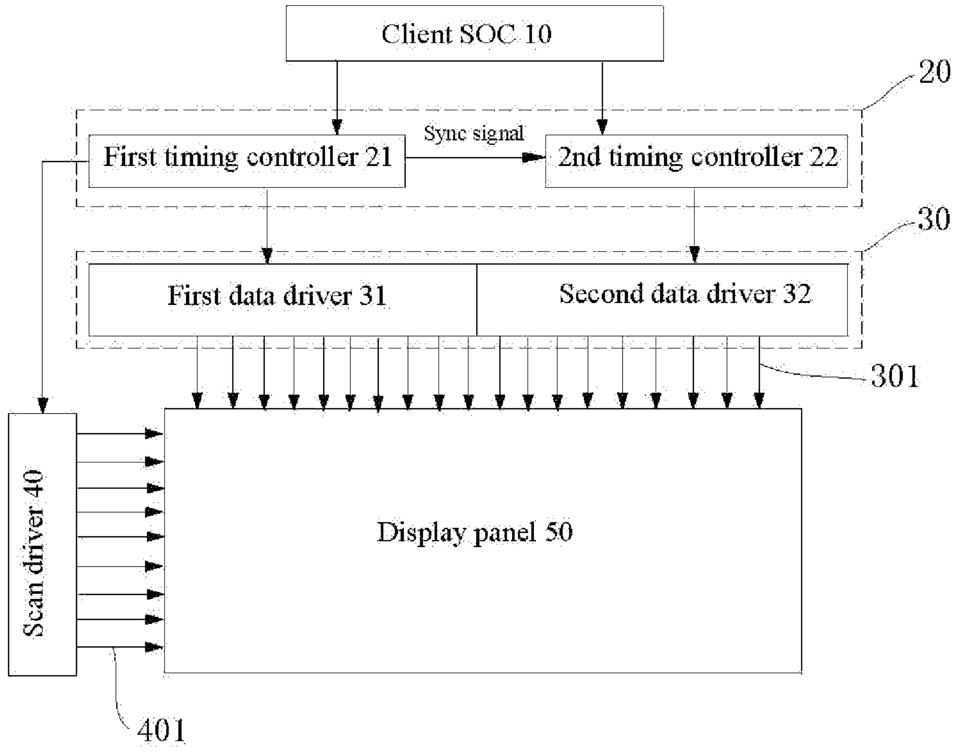
FIG. 1 is a schematic view showing the structure of the liquid crystal display device according to an embodiment of the present invention.

FIG. 1 is a schematic view showing the structure of the liquid crystal display device according to an embodiment of the present invention. In the instant embodiment, a liquid crystal display device 1 comprises a client SOC 10, a timing control module 20, a data driving module 30, a scan driver 40 and a display panel 50. The timing control module 20 comprises a first timing controller 21 and a second timing controller 22. The first timing controller 21 is connected to the client OSC 10, a first data driver 31 and the scan driver 40. The second timing controller 22 is connected to the client SOC 10 and a second data driver 32. The data driving module 30 comprises the first data driver 31 and the second data driver 32.

Figure 2:
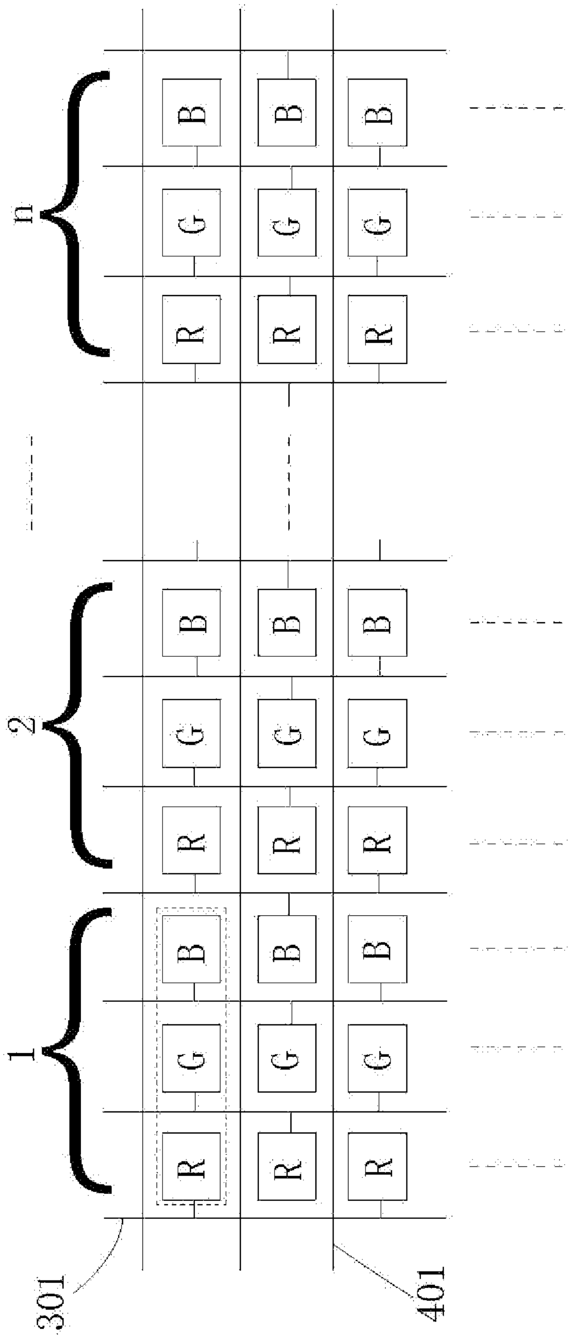
FIG. 2 is a schematic view showing the structure of the display panel according to an embodiment of the present invention.

FIG. 2 shows a schematic view of the display panel 50 of an embodiment of the present invention. The display panel 50 comprises n pixel rows, where n is a multiple of 2. Each pixel row comprises a plurality of pixels. In the instant embodiment, a pixel comprises three sub-pixels in the dash-line box, i.e., R sub-pixel, G sub-pixel and B sub-pixel. Each sub-pixel is arranged, for example, according to the layout in FIG. 2, each row comprises sub-pixels of the same color. In other words, the sub-pixels of the first row are all R sub-pixels, the sub-pixels of the second row are all G sub-pixels, and the sub-pixels of the third row are all B sub-pixels. The sub-pixels of each column are in the order of R sub-pixel, G sub-pixel, B sub-pixel, R sub-pixel, . . . , and so on. Therefore, the display panel 50 comprises 3n sub-pixel rows. Further referring to FIG. 1, the first data driver 31 and the second data driver 32 comprises a plurality of data lines 301. Each data line 301 provides pixel voltage to two adjacent sub-pixels in a crisscross manner. The scan driver 40 comprises a plurality of scan line 401. Each scan line 401 is electrically connected to the sub-pixels of each column and provides suitable voltage to the sub-pixels of each column to conduct or cut off.

Figure 3:
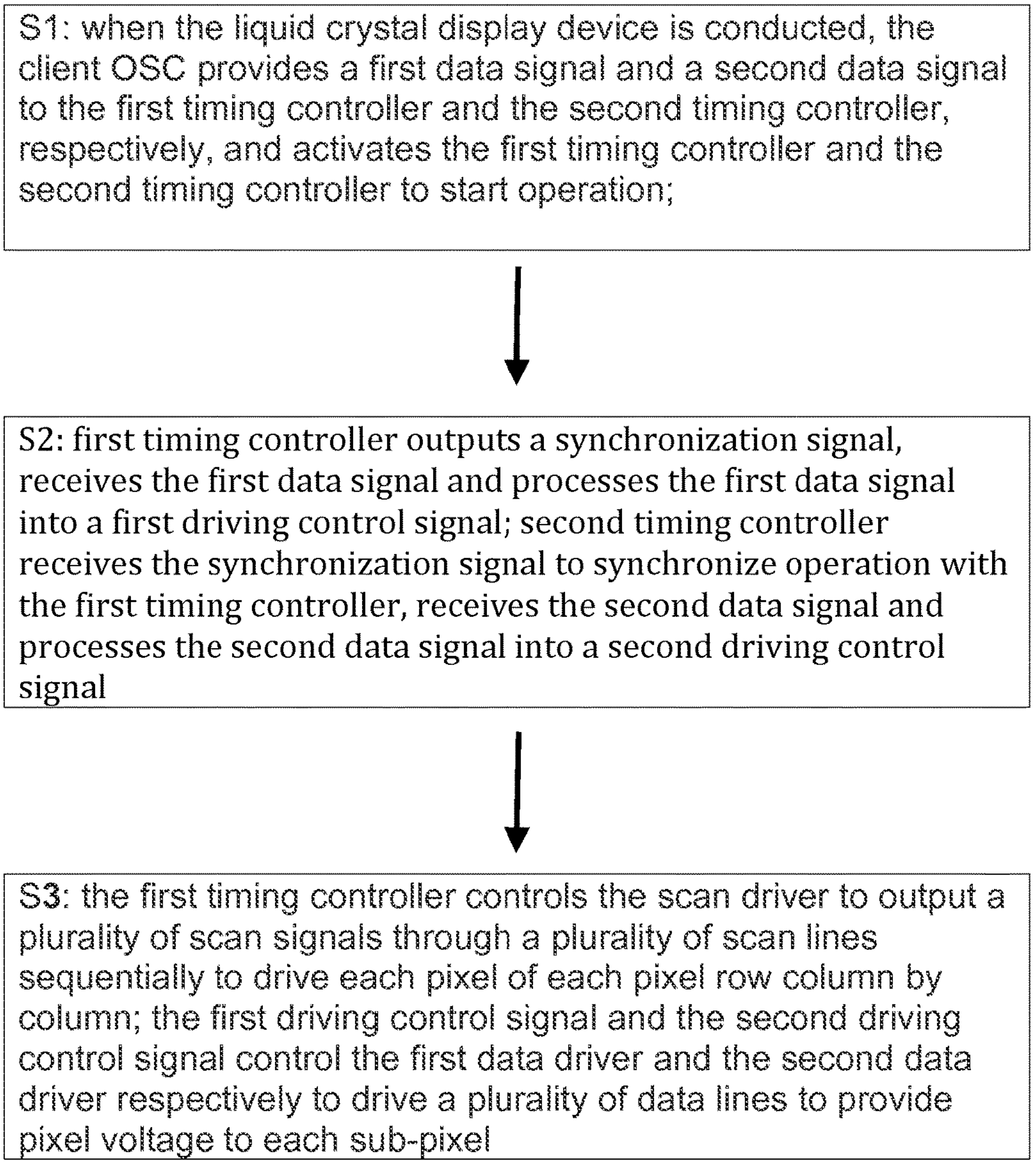
FIG. 3 is a flowchart showing the display driving method of the liquid crystal display device according to an embodiment of the present invention.

Referring to FIG. 3, as well as FIG. 1 and FIG. 2, FIG. 3 is a flowchart showing the display driving method of the liquid crystal display device according to an embodiment of the present invention. The display driving method comprises the following steps.

S1: when the liquid crystal display device 1 is conducted, the client OSC 10 provides a first data signal and a second data signal to the first timing controller 21 and the second timing controller 22, respectively, and activates the first timing controller 21 and the second timing controller 22 to start operation.

S2: first timing controller outputs a synchronization signal, receives the first data signal and processes the first data signal into a first driving control signal; second timing controller receives the synchronization signal to synchronize operation with the first timing controller, receives the second data signal and processes the second data signal into a second driving control signal.

S3: the first timing controller 21 controls the scan driver 40 to output a plurality of scan signals through a plurality of scan lines 401 sequentially to drive each pixel of each pixel row column by column; the first driving control signal and the second driving control signal control the first data driver 31 and the second data driver 32 respectively to drive a plurality of data lines 301 to provide pixel voltage to each sub-pixel.

Figure 4:
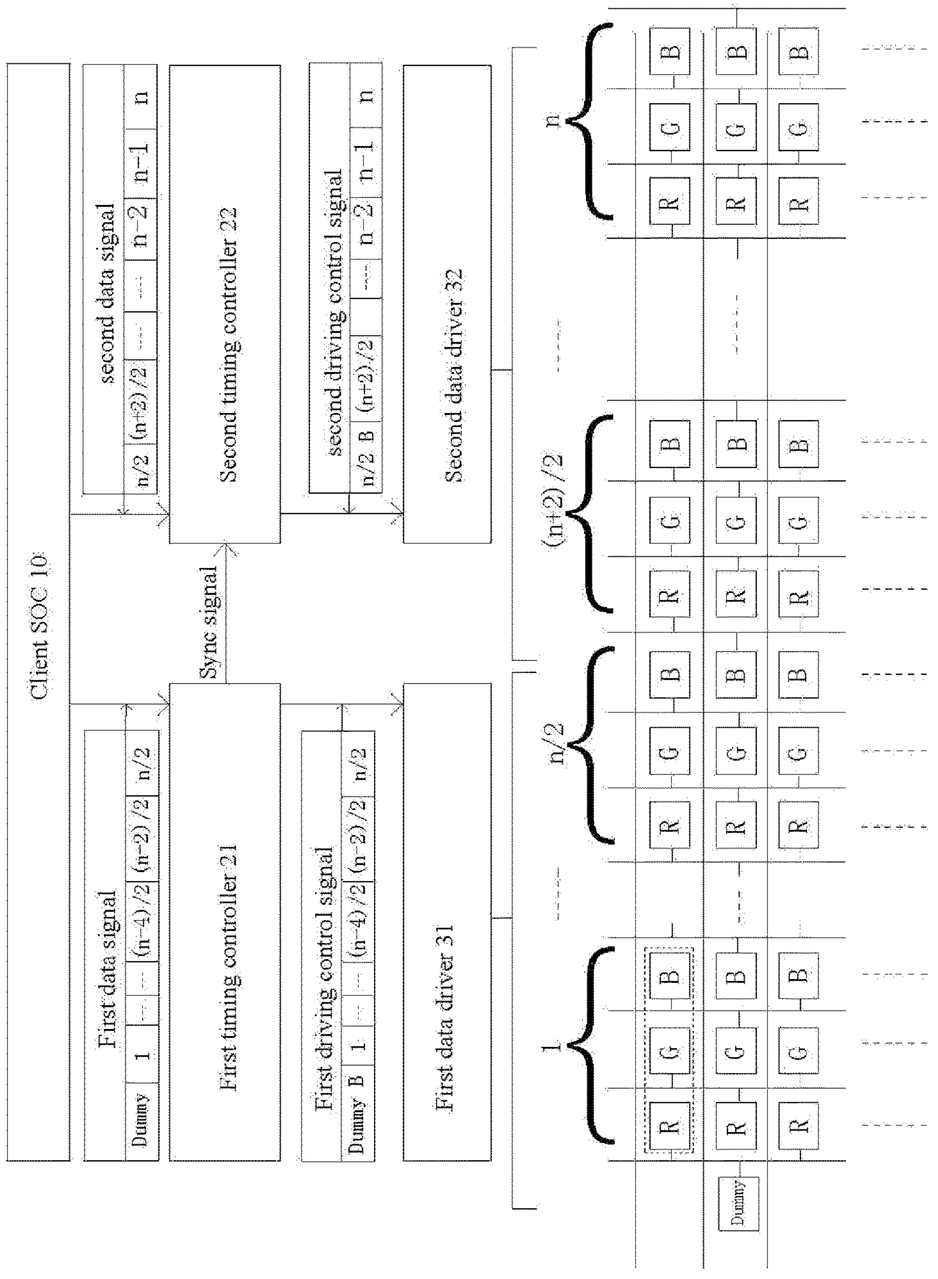
FIG. 4 is a schematic view showing the input and output manner of the timing controller according to an embodiment of the present invention.

FIG. 4 is a schematic view showing the input and output manner of the timing controller according to an embodiment of the present invention. The client SOC 10 transmits the first data signal comprising the data of all pixels from the first pixel row to the n/2-th pixel row and the data of all virtual pixels of a virtual pixel row inserted before the first pixel row to the first timing controller 21, and transmits the second data signal by comprising the data of all pixels from the n/2-th pixel row to the n-th pixel row to the second timing controller 22. Then, the first timing controller 21 processes the first data signal into the first driving control signal comprising the data of all pixels from the first pixel row to the n/2-th pixel row and transmits to the first data driver 31; synchronously, the second timing controller 22 processes the second data signal into the second driving control signal comprising all B sub-pixel data of the B sub-pixel row of the n/2-th pixel row and the data of all pixels from (n+2)/2-th pixel row to n-th pixel row, and transmits to the second data driver 32. Then, the first data driver 31 and the second data-driver 32 synchronously provide pixel voltage to pixels of each row.

Figure 5:
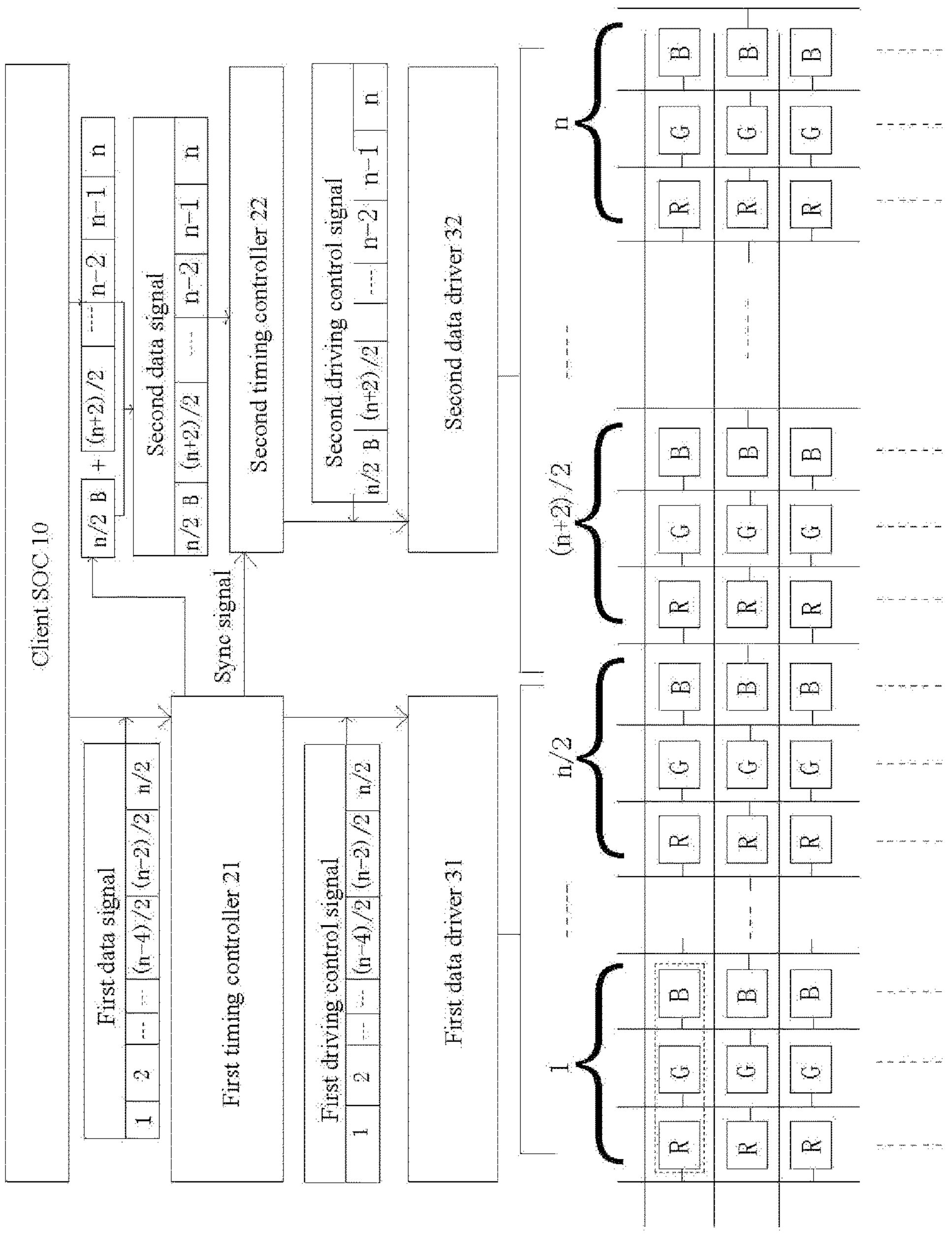
FIG. 5 is a schematic view showing the input and output manner of the timing controller according to another embodiment of the present invention.

FIG. 5 is a schematic view showing the input and output manner of the timing controller according to another embodiment of the present invention. The client SOC 10 transmits the first data signal comprising the data of all pixels from the first pixel row to the n/2-th pixel row to the first timing controller 21, and transmits the data of all pixels from the (n+2)/2-th pixel row to the n-th pixel row to the second timing controller 22. At the same time, the first timing controller 21 transmits all B sub-pixel data of the B sub-pixel row of the n/2-th pixel row to the second timing controller 22. The data of all pixels from (n+2)/2-th pixel row to n-th pixel row and t all B sub-pixel data of the B sub-pixel row of the n/2-th pixel row form the second data signal. Then, the first timing controller 21 processes the first data signal into the first driving control signal comprising the data of all pixels from the first pixel row to the n/2-th pixel row and transmits to the first data driver 31; synchronously, the second timing controller 22 processes the second data signal into the second driving control signal comprising the data of all pixels from (n+2)/2-th pixel row to n-th pixel row and t all B sub-pixel data of the B sub-pixel row of the n/2-th pixel row, and transmits to the second data driver 32. Then, the first data driver 31 and the second data-driver 32 synchronously provide pixel voltage to pixels of each row.

In summary, compared to the known liquid crystal display device disposed with a timing controller, the liquid crystal display device and display driving method of the present invention, through disposing two timing controllers in the liquid crystal display device and modifying the input and output manners of the timing controllers, can make the two timing controllers to synchronously control the pixel display of the liquid crystal display device. In particular, the present invention can synchronously support the high resolution output of the liquid crystal display device.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A liquid crystal display device, which comprises:

a display panel, further comprising n of pixel rows, n being a multiple of 2, each pixel row comprising a plurality of pixels;

a scan driver, comprising a plurality of scan line extending outwards, each scan line being connected correspondingly to pixels of the same column of each pixel row;

a plurality of data drivers, comprising a plurality of data lines extending outwards, each data line being connected to two adjacent two rows of pixels in crisscross manner to provide a plurality of pixel voltages to the plurality of pixels;

a first timing controller, for controlling the scan driver, receiving and processing a first data signal, outputting a synchronization signal and a first driving control signal, the first driving control signal controlling a first data driver to drive the display of all pixels in a part of pixel rows of the n pixel rows; and a second timing controller, for receiving the synchronization signal and a second data signal, processing the second data signal, outputting a second driving control signal, the second driving control signal controlling a second data driver to drive the display of all pixels in the other part of pixel rows of the n pixel rows, wherein each pixel comprises an R sub-pixel, a G sub-pixel and a B sub-pixel, and the R sub-pixel, G sub-pixel and B sub-pixel are arranged in column so that the display panel comprises 3n sub-pixel rows, wherein the first data signal comprises the data of all pixels from the first pixel row to the n/2-th pixel row, the first timing controller transmits all B sub-pixel data of the B sub-pixel row of the n/2-th pixel row of the first data signal to the second timing controller so as to make the second data signal comprise all B sub-pixel data of the B sub-pixel row of the n/2-th pixel row, which are received from the first timing controller, and the data of all pixels from (n+2)/2-th pixel row to n-th pixel row, which are received from an image source, and the first data driver and the second data driver synchronously drives the B sub-pixel row of the n/2-th pixel row, wherein only a part of the first data signal is transmitted to and used by the second timing controller.

2. The liquid crystal display device as claimed in claim 1, wherein the first data signal comprises the data of all pixels from the first pixel row to the n/2-th pixel row and the data of all virtual pixels of a virtual pixel row inserted before the first pixel row; the second data signal comprises the data of all pixels from the n/2-th pixel row to the n-th pixel row.

3. The liquid crystal display device as claimed in claim 2, wherein the first driving control signal comprises the data of all pixels from the first pixel row to the n/2-th pixel row; the second driving control signal comprises a plurality of B sub-pixel data of the B sub-pixel row of the n/2-th pixel row and the data of all pixels from (n+2)/2-th pixel row to n-th pixel row.

4. The liquid crystal display device as claimed in claim 1, wherein the first driving control signal comprises the data of all pixels from the first pixel row to the n/2-th pixel row; the second driving control signal comprises a plurality of B sub-pixel data of the B sub-pixel row of the n/2-th pixel row and the data of all pixels from (n+2)/2-th pixel row to n-th pixel row.

5. A display driving method of liquid crystal display device, applicable to a liquid crystal display device comprising n pixel rows, wherein the display driving method comprises the steps:

(a) providing a first data signal and a second data signal, wherein the first data signal comprising data of all pixels of a part of pixel rows of the n pixel rows, the second data signal comprising data of all pixels of the other part of pixel rows of the n pixel rows;

(b) a first timing controller outputting a synchronization signal, receiving the first data signal, and processing the first data signal into a first driving control signal; a second timing controller receiving the synchronization signal to synchronize operation with the first timing controller, receiving the second data signal, and processing the second data signal into a second driving control signal; and (c) the first timing controller controlling a scan driver to scan all pixels column by column, the first driving control signal driving the display of all pixels of a part of pixel rows of the n pixel rows, the second driving control signal driving the display of all pixels of the other part of pixel rows of the n pixel rows, wherein each pixel comprises an R sub-pixel, a G sub-pixel and a B sub-pixel, and the R sub-pixel, G sub-pixel and B sub-pixel are arranged in column so that the display panel comprises 3n sub-pixel rows, wherein the method further forms the first data signal by comprising the data of all pixels from the first pixel row to the n/2-th pixel row, through the first timing controller to transmit all B sub-pixel data of the B sub-pixel row of the n/2-th pixel row of the first data signal to the second timing controller so as to make the second data signal comprise all B sub-pixel data of the B sub-pixel row of the n/2-th pixel row, which are received from the first timing controller, and the data of all pixels from (n+2)/2-th pixel row to n-th pixel row, which are received from an image source, and the first data signal and the second data signal are used for synchronously driving the B sub-pixel row of the n/2-th pixel row, wherein only a part of the first data signal is transmitted to and used by the second timing controller.

6. The display driving method as claimed in claim 5, wherein the method further forms the first data signal by comprising the data of all pixels from the first pixel row to the n/2-th pixel row and the data of all virtual pixels of a virtual pixel row inserted before the first pixel row; and forms the second data signal by comprising the data of all pixels from the n/2-th pixel row to the n-th pixel row.

7. The display driving method as claimed in claim 6, wherein the first driving control signal comprises the data of all pixels from the first pixel row to the n/2-th pixel row; the second driving control signal comprises a plurality of B sub-pixel data of the B sub-pixel row of the n/2-th pixel row and the data of all pixels from (n+2)/2-th pixel row to n-th pixel row.

8. The display driving method as claimed in claim 5, wherein the first driving control signal comprises the data of all pixels from the first pixel row to the n/2-th pixel row; the second driving control signal comprises a plurality of B sub-pixel data of the B sub-pixel row of the n/2-th pixel row and the data of all pixels from (n+2)/2-th pixel row to n-th pixel row.

* * * * *